Figure 1:
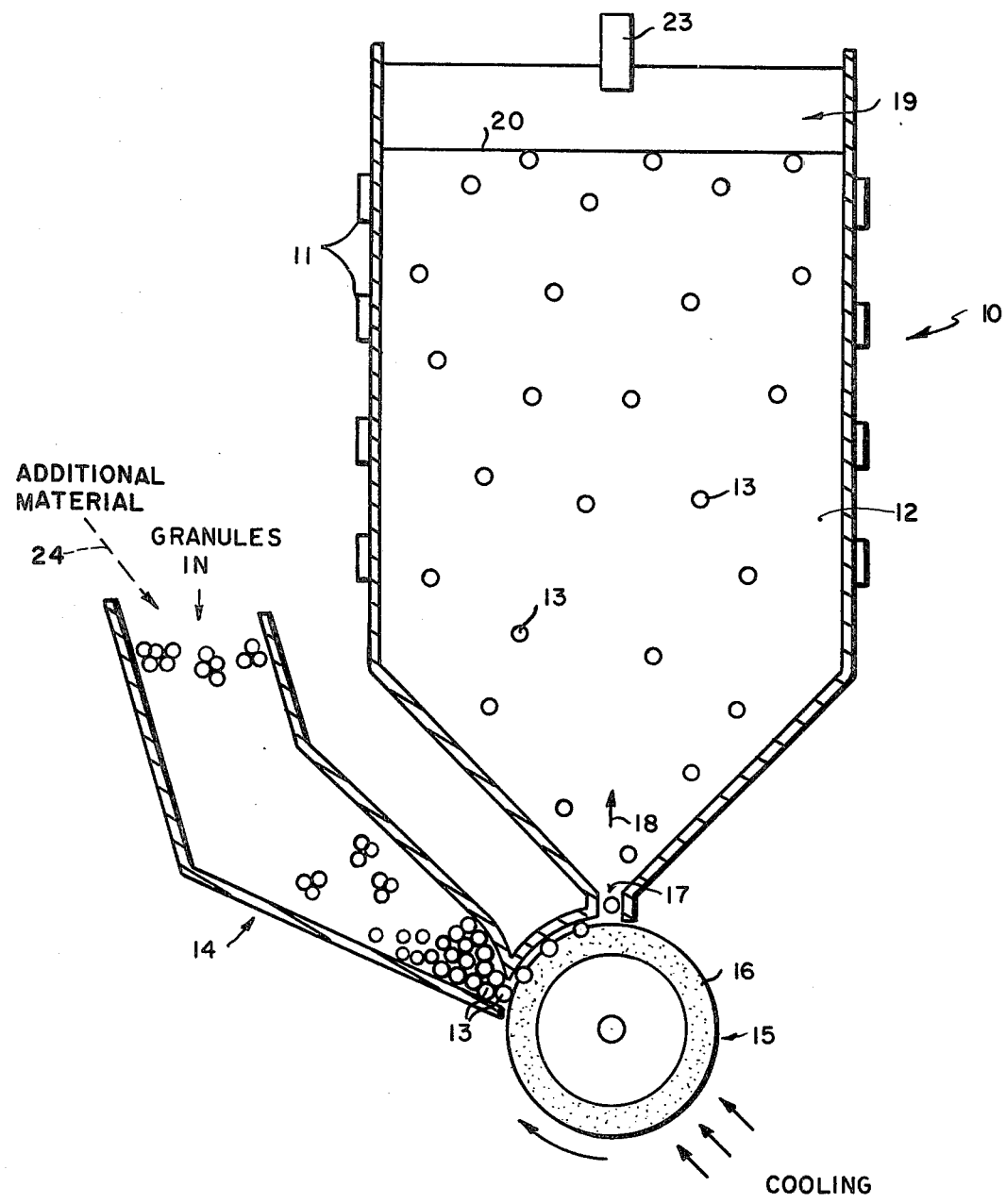

United States Patent [19]

Suh et al.

[11] 4,188,185

[45] Feb. 12, 1980

[54] METHOD AND APPARATUS FOR THE TREATMENT OF PARTICULATE MATERIALS

[75] Inventors: Nam P. Suh, Sudbury; Salvatore C. Malguarnera, Medford, both of Mass.

[73] Assignee: Massachusetts Institute of Technology, Cambridge, Mass.

[21] Appl. No.: 824,246

[22] Filed: Aug. 12, 1977

[51] Int. Cl.² .................................................. F27B 15/00
[52] U.S. Cl. ........................................ 432/27; 432/28; 432/30; 432/58; 432/215; 264/329; 425/DIG. 39; 34/10
[58] Field of Search .................. 432/14, 15, 27–30, 432/58, 161, 197, 210, 211, 214, 215; 126/343.5 A; 34/10, 57 R; 425/DIG. 39; 165/111; 264/329, 349

[56] References Cited

U.S. PATENT DOCUMENTS

| | | | |
|---|---|---|---|
| 2,530,274 | 11/1950 | Weber | 432/30 |
| 3,117,064 | 1/1964 | Friedrich | 432/58 |
| 3,163,888 | 1/1965 | Shattuck | 126/343.5 A |
| 3,519,064 | 7/1970 | Cooper | 432/30 |
| 3,630,501 | 12/1971 | Shabaker | 432/27 |
| 3,753,661 | 8/1973 | Simons | 126/343.5 A |
| 4,069,107 | 1/1978 | Koppelman et al. | 432/215 |

FOREIGN PATENT DOCUMENTS 1203286  8/1970  United Kingdom ................... 165/111

*Primary Examiner*—Henry C. Yuen
*Attorney, Agent, or Firm*—Arthur A. Smith, Jr.; Robert F. O'Connell

[57] ABSTRACT

A process and apparatus for treating materials, such as solid, particulate material, wherein the particulate material is introduced into a heat transfer medium, the density of such medium being different from that of the particulate material and the temperature of such medium being higher than that of the particulate material when so introduced. The particulate material, the individual particles of which are preferably introduced separately, travels through the medium and becomes heated thereby to a generally flowable state. The flowable particles of the particulate material thereupon leave the fluid and coalesce to form a flowable mass thereof external to the heat transfer medium.

8 Claims, 3 Drawing Figures

METHOD AND APPARATUS FOR THE TREATMENT OF PARTICULATE MATERIALS

The Government has rights in this invention pursuant to NSF Cooperative Agreement No. CG-0006 awarded by the National Science Foundation.

INTRODUCTION

This invention relates generally to the treatment of particulate materials and, more particularly, to the heating of particulate materials, such as polymer granules, to provide a relatively uniform, flowable mass thereof which can be used for further processing, as in extrusion, or other molding processes.

BACKGROUND OF THE INVENTION

It is desirable to obtain a flowable mass of polymer plastic materials which can be utilized in extrusion and injection molding apparatus, and the like. The flowable plastic material is usually formed from particulate material, i.e., polymer granules which must be softened to form a flowable mass thereof. As is well known in plasticating extruders, for example, the plastic granules are supplied to a screw-type extrusion pump which softens compacted granules by pressure which creates frictional heat among the compacted particles which are supplied thereto so that at the molding end of the extrusion screw the particles are converted to a flowable mass of plastic which can be extruded through an appropriate die.

Such plasticating extruders are not always effective because the heat efficiency is relatively low and the process can adversely affect the mechanical properties of the plastic material. Other plasticizing extruders, such as that shown by U.S. Pat. No. 3,354,501 of Bachman et al., use external steam generators to heat the barrel of a ram-operated extrusion device and suffer from the same problem of obtaining a sufficiently uniform mass of flowable material.

If, in such extruder devices, the granules are, alternatively, pre-heated to a flowable state before supplying them to the extruder by applying heat to a compacted mass of such particles in an appropriate container, the low thermal conductivity of the plastic particles tends to prevent a uniform heating of the granules if relatively high temperature heating is used since, by the time the interior particles are heated, the exterior particles are at such a high temperature that the plastic tends to degrade. If relatively low temperature heating is used to avoid such a problem, the low temperature heating that is required leads to unacceptably long processing time which is impractical for use in commercially feasible systems. Accordingly, a uniform flowable mass of the material is difficult, if not impossible, to achieve in a practical manner by pre-heating a compacted mass thereof.

Another method for heating plastic granules is described in U.S. Pat. No. 3,163,888, issued to R. Shattuck, in which a chamber, containing purposely immovable granules, has perforated walls through which a warm gas under low pressure is introduced. Apart from the difficulty in achieving uniform heating of the granules which are in contact with each other within the chamber, the mass which is transferred from the chamber tends to contain gas which becomes entrapped within the interstices between the granules. Such entrapped gas alters the homogeneity of the flowable mass which is required in many applications and tends to weaken the material which ultimately forms a molded article, for example.

BRIEF SUMMARY OF THE INVENTION

In order to provide an efficient system for heating particulate material so as to produce a substantially uniform mass of flowable material of relatively high viscosity which can be useful in a molding process, the invention effectively provides for the heating of the particulate material in such a way that the particles are each effectively individually heated, the individually heated particles then being collected into a relatively uniform, or homogeneous, flowable mass thereof. Such a result is achieved by providing a high temperature fluid having a different density than that of the particulate material, which fluid serves as a heat transfer medium. The granules are introduced into the fluid effectively individually and, because of the density differential, they travel through the fluid and during such travel become heated. The heated particles which are then in a substantially flowable state are collected by coalescence into a previously formed flowable mass thereof, the coalesced flowable mass thereby being available for extraction and transfer to a molding apparatus by utilizing, for example, a suitable extraction pump.

DESCRIPTION OF THE INVENTION

Figure 2:
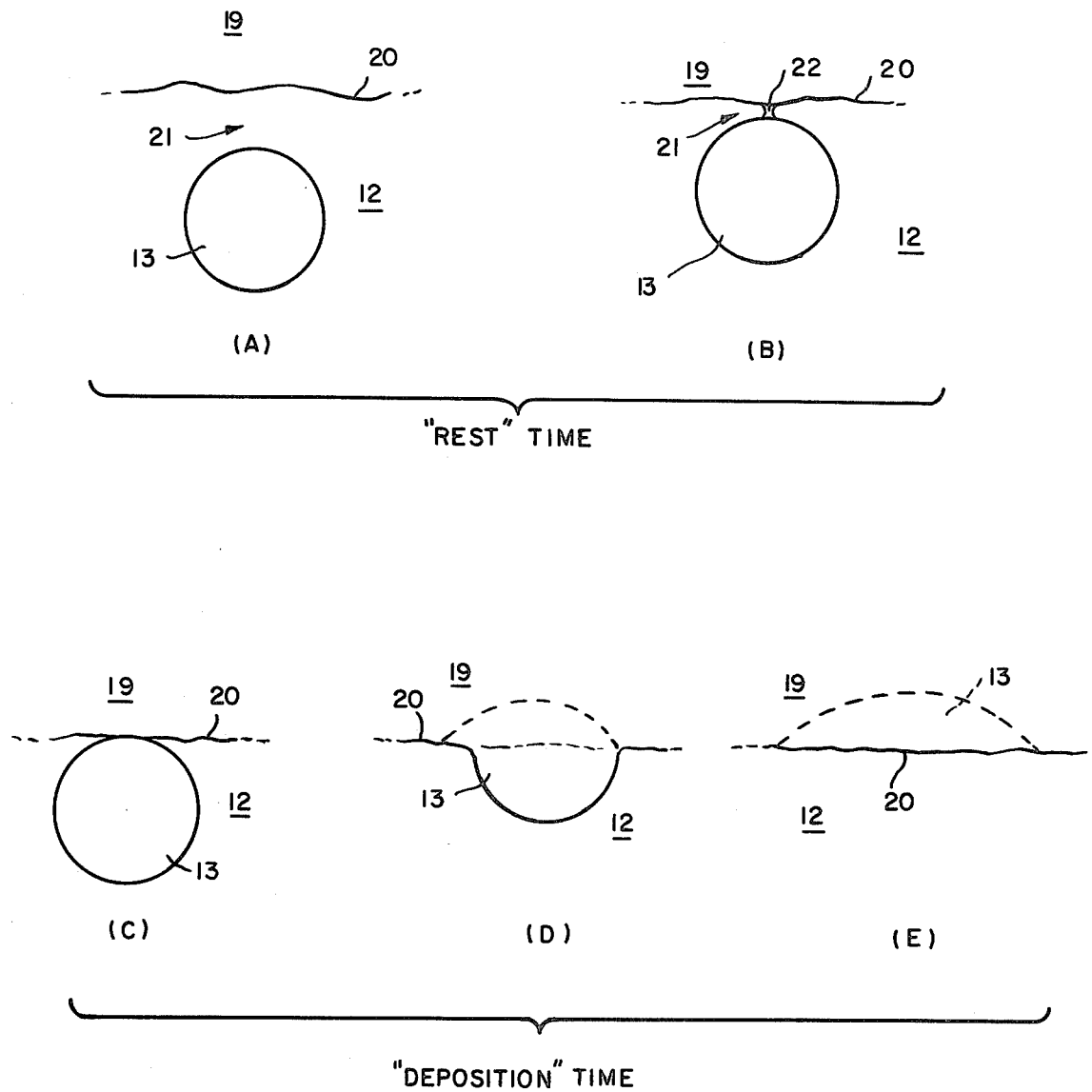
Figure 3:
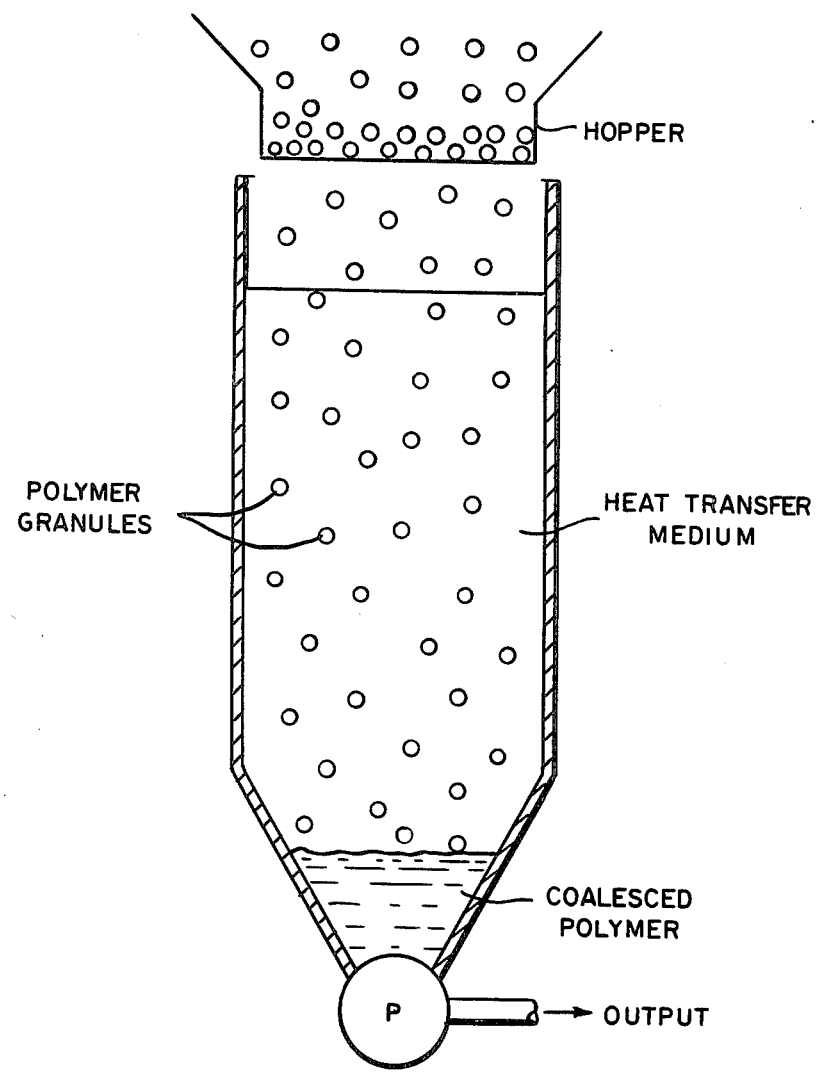

The invention can be described in more detail with the help of the accompanying drawings wherein FIG. 1 shows in diagrammatic form an exemplary embodiment of the invention for treating particulate material to form a flowable mass thereof; and FIG. 2 shows various stages (A) through (E) in the coalescence of flowable particulate material into the flowable mass thereof in the embodiment of FIG. 1;

FIG. 3 depicts an alternative embodiment of the invention.

As can be seen in FIG. 1, a container 10 having a plurality of heater members 11 for heating material therein contains a fluid, heat transfer medium 12. Such medium, for example, can be a liquid metal medium, the heaters being sufficient to heat the metal to its liquid phase within the container.

Particulate material as, for example, polymer granules, are supplied to one end of the container, in this case at the lower end thereof as shown in the figure. The granules 13, for example, may be fed in a well known manner from a hopper device 14 to a region adjacent a rotating disc-like member 15 having a soft rubber surface 16 about its periphery. As the soft rubber surface passes by the granules 13, the surface is deformed and captures the granular material so as to move it to an opening 17 at the lower end of the container 10.

The density of the fluid medium 12 within the container 10, for example, can be much greater than that of the plastic granules 13 so that, as the latter pass by the opening 17, they tend to rise by buoyant forces upwardly, as shown by arrow 18, into the fluid medium and travel upwardly through the high temperature, heat transfer fluid medium 12 in container 10. The rotating member 15 may be appropriately cooled in any suitable manner, as shown, during operation of the system.

As individual granules 13 move upwardly through the fluid medium 12 they are heated substantially individually so that by the time they reach the upper portion of the container 10 they are in a softened and flowable state. As shown by stage (A) of FIG. 2, the flowable particles 13 ultimately reach the interface 20 between the upper surface of the heat transfer medium 12 and the lower surface of a flowable mass 19 of the partuculate material which is in contact therewith. As the heated and flowable particles approach interface 20, they are substantially decelerated and effectively come to rest thereat for a finite time period prior to entry into mass 19. At such position, the flowable particles tend to be prevented from entering the flowable mass 19 at interface 20 because of the presence of a thin film of fluid medium which is present at the region 21 between the flowable particle and the interface. As shown by stage (B) of FIG. 2, as the thin film of high temperature fluid medium drains away from the flowable particle 13 at the interface, the thin film ruptures and the now flowable particle begins its entry through the rupture 22 into the flowable mass 19. The entry process, once rupture has occurred, takes place over a finite time period until the flowable particle is substantially completely coalesced into the flowable mass 19, as shown by stages (C), (D), and (E) of FIG. 2.

In effect, the overall process occurs during three time periods, a first time phase being the "heating" time during which the particulate material travels from opening 17 through the heat transfer medium 12 to the interface 20, a second time phase being the "rest" time during which the now flowable particle remains substantially at rest at the interface until the thin film rupture occurs to permit the flowable particle 13 to begin its entry into flowable mass 19, and a third time phase being the "deposition" time during which the flowable particle enters and is substantially completely coalesced into flowable mass 19. For the purposes of describing the invention herein the terms "coalesced" and "coalescence" are used to describe the process by which, during the rest time and the deposition time, the flowable particle, which is present in the heat transfer fluid medium at its interface with a flowable mass of particulate material, joins such flowable mass through such interface.

The flowable mass containing the flowable particles which have been coalesced thereinto can be appropriately extracted for use as desired. For example, the flowable mass may be pumped to a suitable molding apparatus by any well known and appropriate extraction pump 23, as shown in FIG. 1, and supplied to an extruder, or an injection molding, apparatus. Other uses requiring a flowable mass of material may be made thereof. For example, the material may be suitably drawn off from the flowable mass, using known techniques, in the form of a film thereof.

While in some applications it may be desirable to supply the granular material slowly but essentially continuously to the heat transfer medium, it may be preferable in some applications to supply groups of such granules intermittently to avoid an undue crowding of flowable particles at the interface 20. If too many particles approach the interface and come to rest there at the same time before entering into the flowable mass, the flowable particles may come into contact with each other in such a way as to entrap portions of the heat transfer medium therebetween. The entrapped fluid medium may be carried together with the flowable particles into the flowable mass 19 and in some cases the presence thereof will adversely affect the desired homogeneity thereof in many applications. Such entrapment can be avoided if the particles are supplied to the heat transfer medium intermittently or relatively slowly enough to avoid crowding of the heated particles at the interface.

While in many applications such entrapment is undesirable, in some cases it may be advantageous to do so purposely. Thus, it may be desired to change the electrical or mechanical properties of the flowable mass by entrapping liquid metal (used as the heat transfer medium) or entrapping other fluid media, the presence of which can affect such properties in a desired manner.

In a preferred embodiment, as mentioned above, the heat transfer medium may be a liquid metal, such as mercury, although other metals can be used. One other such metal which appears to be useful, for example, and which avoids the toxicity problems associated with mercury, is a trinary alloy of bismuth, lead, and tin. Other heat transfer media, such as silicone oils, for example, can also be utilized in some applications.

The rest and deposition times during which the heated and flowable particle enters and finally coalesces into the flowable mass 19 depend in large measure upon the density differential between the heat transfer medium and the particulate material, the greater the density difference the shorter, in general, the rest and the deposition times. Because the density difference between silicone oils and the polymer materials generally used in many molding processes, for example, is much less than that between liquid metals and such polymer materials, the rest and deposition times when using silicone oils tend to be relatively long (in some cases as high as one or two orders of magnitude longer) than the rest and deposition times which occur when using liquid metals. Hence, in many applications where relatively high outputs of flowable materials are required it is preferable to utilize liquid metal material as the heat transfer medium rather than materials such as high temperature oils. With generally lower overall coalescence time (i.e., rest time plus deposition time) the overall output can be greater per unit time and the system can be more effective for supplying high rates of flowable mass to a desired molding apparatus, for example.

A specific exemplary embodiment of the process and apparatus of the invention may utilize mercury heated to a temperature of 220° C. The granular material comprises polystyrene granules having average diameters of about 3 millimeters which enter the high temperature mercury at a temperature of 20° C. The granules will ultimately reach a temperature of about 215° C. at the interface as they travel through the mercury over a "heating" time period of about 0.5 seconds on the average. The density differential requires a liquid metal height of about 15 centimeters to produce such a "heating" travel time. The "rest" time is about 0.2 seconds, while the "deposition" time will be about 60 seconds. The results for mercury are effectively characteristic of liquid metals in general, including the trinary alloy mentioned above. In contrast, the use of silicone oils as the heat transfer medium, substantially at the same medium and entry temperatures, requires a "heating" time of about 3 seconds (and, hence, a liquid medium height of about 30 centimeters), a rest time of about 11 seconds, and a deposition time of about 70 minutes. The overall processing time using silicone oils is between one and two orders of magnitude longer than that using liquid metals as the heat transfer medium.

While the above description involves the conversion of polymer granules from a solid state to a flowable state for providing a relatively homogeneous mass of flowable material, the process and apparatus described herein is not limited thereto. For example, the particulate material may be accompanied by other filler materials such as glass fibers, and the like, for varying the mechanical properties of the ultimate molded article made from the flowable mass as shown by the dashed line 24 wherein such other filler material is added at the hopper device together with the granules. Such combination of polymer particulate material and filler material can be supplied to the heat transfer medium without affecting the overall operation of the system, while still providing a flowable mass which includes the flowable particulate material together with whatever desired amount of filler is required. Accordingly, the system of the invention is more advantageous than presently available apparatus in which the addition of filler material raised considerable problems such as the abrasive wear of metal parts of the apparatus due to the presence of the glass fibers.

Further, while the process and apparatus is described as converting particulate material to relatively highly viscous, flowable material, the process and apparatus is not limited thereto but may be utilized to change the state of the input material from a solid to a fully melted, relatively low viscosity, material. The cross-sectional area of the container 10 and the length thereof will generally be determined by the application for which apparatus is to be used. Lengthening the fluid medium and, hence, the container 10 provides a longer heating time and increasing the cross-sectional area (and, in effect, the volume of the container) provides a greater amount of flowable material so that the latter can be supplied at a greater rate for subsequent use.

While the process and apparatus described with reference to FIG. 1 shows a heat transfer medium having a higher density than the material which is to be treated, the device can also operate with heat transfer media having lower densities than the treated material. In the latter cases, the particulate material can be supplied at the upper end thereof so that the particles move downwardly therethrough to a flowable mass at the lower end as shown in FIG. 3.

In the embodiment of FIG. 1, a flowable mass 19 of material can be initially supplied at the upper end of the heat transfer medium when the process is begun or it can be formed during the early operation of the process before any material is extracted therefrom. If the process is initiated without an initial flowable mass of material 19 present at the surface of the heat transfer medium, the latter medium is initially exposed to the atmosphere and, if a liquid metal, may tend to oxidize. The treated particulate matter which then forms the flowable mass 19 during the early operation of the process will also tend to become covered with oxide so that a truly homogeneous mass of particulate material cannot be achieved. In order to prevent such a problem, the metal medium can be present in solid form within container 10 prior to operation and a previously formed solid mass, or plug, of the material to be treated can be placed within the container in contact with the upper surface of the metal medium. When the heaters 11 are activated, the metal is melted so as to form a liquid heat transfer medium and the solid mass of material to be treated becomes flowable so as to provide a flowable mass thereof before the particulate material is supplied at the other end. The solid mass of material covering the heat transfer medium acts as an effective barrier to the oxidation of the metal and such problem is avoided.

While the embodiment shown in the figures and discussed above represents an effective preferred embodiment of the invention as now envisioned, modifications thereof within the scope of the invention will occur to those in the art. Hence, the invention is not to be limited except as defined by the appended claims.

What is claimed is:

1. A system for treating solid polymer plastic particulate material comprising means for containing a heated fluid medium comprising mercury having a density which differs from the density of said particulate material;

means for heating said mercury to at least about 200° C.;

means for introducing said particulate material in the form of solid granules at a temperature of about 20° C. into said heated fluid medium at the lower end thereof so that the particles of said particulate material travel upwardly therethrough to the upper end thereof and become sufficiently heated to reach a flowable state, the density differential between said particles and said fluid thereby causing said particles to leave said fluid and to coalesce and form a flowable mass thereof external to said fluid.

2. A method for treating solid particulate material comprising the steps of
   providing a fluid medium having a density which differs from that of said particulate material;
   heating said fluid medium to a temperature higher than that of said particulate material;
   introducing particles of said particulate material into said heated fluid medium whereby said particles travel through said medium and become heated to a flowable state,
   said particles coming to and remaining at a general state of rest near a surface of said fluid medium, a thin film of said fluid medium being present between said particles and said surface,
   each of said flowable particles being permitted to leave said fluid medim when said thin film ruptures at a region adjacent thereto, the density differential between said particles and said fluid medium causing said particles upon leaving to form a flowable mass of particulate material into which said particles are thereby coalesced.

3. A system in accordance with claim 2 wherein the overall time for treating said particulate materials includes
   a first time period during which said particles are heated as they travel through said fluid medium;
   a second time period during which said particles are at said general state of rest prior to rupture of said thin film; and
   a third time period during which said particles leave said fluid medium and coalesce to form said flowable means.

4. A method in accordance with claim 2 wherein
   said particles are introduced into said heated fluid medium sufficiently slowly so as to prevent the crowding of flowable particles at said surface of said heated fluid medium.

5. A method in accordance with claim 4 wherein
   groups of said particles are introduced into said heated fluid medium intermittently.

6. A method in accordance with claim 2 wherein
   said introductory step further includes introducing additional material into said heated fluid medium together with said particles;

said additional material being coalesced into said flowable mass together with said flowable particles.

7. A method in accordance with claim 6 wherein said additional material which is introduced comprises glass fibers.

8. A system for treating solid, polymer plastic particulate material comprising means for containing a heated fluid medium, comprising a trinary alloy of bismuth, lead and tin, having a density which differs from the density of said particulate material, the percentages of weight of each element of said alloy being selected to provide a predeterminal melting point therefor;

means for heating said alloy to at least about 200° C.;

means for introducing said particulate material in the form of solid granules at a temperature of about 20° C. into said heated fluid medium at the lower end thereof so that the particles of said particulate material travel upwardly therethrough to the upper end thereof and become sufficiently heated to reach a flowable state, the density differential between said particles and said fluid thereby causing said particles to leave said fluid and to coalesce and form a flowable mass thereof external to said fluid.

* * * * *